(12) United States Patent
Mimassi

(10) Patent No.: US 10,664,933 B2
(45) Date of Patent: *May 26, 2020

(54) AUTOMATED PATRON IDENTIFICATION AND COMMUNICATION MANAGEMENT

(71) Applicant: Rockspoon, Inc., San Jose, CA (US)

(72) Inventor: Nagib Georges Mimassi, Palo Alto, CA (US)

(73) Assignee: ROCKSPOON, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/221,531

(22) Filed: Jul. 27, 2016

(65) Prior Publication Data

US 2017/0278201 A1  Sep. 28, 2017

Related U.S. Application Data

(60) Provisional application No. 62/313,693, filed on Mar. 25, 2016.

(51) Int. Cl.
*G06Q 50/12* (2012.01)
*G06Q 30/02* (2012.01)

(52) U.S. Cl.
CPC ......... *G06Q 50/12* (2013.01); *G06Q 30/0281* (2013.01)

(58) Field of Classification Search
USPC .......................................................... 705/15
See application file for complete search history.

(56) References Cited

U.S. PATENT DOCUMENTS

| | | | |
|---|---|---|---|
| 7,945,477 B2 | 5/2011 | Werbitt | |
| 8,898,075 B2* | 11/2014 | Khuchua-Edelman | ...................... G06Q 30/0633 235/379 |
| 2007/0088624 A1* | 4/2007 | Vaughn | .................. G06Q 30/02 705/15 |
| 2014/0257877 A1* | 9/2014 | L'Heureux | ............ G06Q 30/06 705/5 |
| 2015/0088671 A1* | 3/2015 | Xiong | .................. G06Q 30/016 705/15 |
| 2015/0278899 A1* | 10/2015 | Fuggetta | ............ G06Q 30/0613 705/26.41 |
| 2015/0278926 A1* | 10/2015 | Fang | ...................... G06Q 50/12 705/15 |
| 2015/0358423 A1 | 12/2015 | L'Heureux et al. | |

* cited by examiner

*Primary Examiner* — Scott A Zare
(74) *Attorney, Agent, or Firm* — Brian R. Galvin; Galvin Patent Law LLC

(57) ABSTRACT

A system and method for automated patron identification and communication management, comprising a patron management server that receives location and ID information from a plurality of client devices via a network, directs a display manager, and retrieves patron information from a patron profile data store; a display manager that presents patron information for viewing; and a patron profile data store that stores and provides patron information.

7 Claims, 9 Drawing Sheets

AUTOMATED PATRON IDENTIFICATION AND COMMUNICATION MANAGEMENT

CROSS-REFERENCE TO RELATED APPLICATIONS

This application claims the benefit of, and priority to, U.S. provisional patent application Ser. No. 62/313,693, titled "AUTOMATED CUSTOMER IDENTIFICATION SYSTEM" and filed on Mar. 25, 2016, the entire specification of which is incorporated herein by reference in its entirety.

BACKGROUND OF THE INVENTION

Field of the Art

The disclosure relates to the field of restaurant management, and more particularly to the field of automated customer management.

Discussion of the State of the Art

It is often difficult for diners to select a restaurant or other venue that satisfies all the needs of a group, having to factor in complex preferences like dietary or allergy requirements, cost, location, and other needs for each member of a party. Additionally, once a restaurant is selected, ordering may be difficult as a host has to remember detailed preferences for individuals without losing track of orders, and both patrons and hosts may need to navigate crowded areas to interact, especially in venues where people move about, such as at a bar or tavern, or at an outdoor venue such as a festival or sporting event.

Present attempts to address these various needs utilize a number of disjointed systems that may or may not integrate with one another, leaving holes in any solution and producing large technical hurdles for a venue operator and inconvenience for both patrons and staff.

What is needed, is a system and method to automatically identify patrons and provide their location and personalized information, assist in communication and navigation for patrons and hosts, facilitate rapid modification of patron information, create opportunities and provide functionality for proximity-based customer service, and assist patrons in group operations like selecting a venue and ordering.

SUMMARY OF THE INVENTION

Accordingly, the inventor has conceived and reduced to practice, in a preferred embodiment of the invention, a system and method for automated patron identification and communication management.

According to a preferred embodiment of the invention, a system for automated patron identification and communication management, comprising: a location beacon comprising at least a plurality of programming instructions stored in a memory and operating on a processor of a network-connected computing device and configured to utilize a plurality of connected hardware devices to determine geolocation information for the computing device, and configured to provide at least a portion of this geolocation information via a network, and configured to provide a device identifier via a network, the device identifier being unique to the location beacon; a patron management server comprising at least a plurality of programming instructions stored in a memory and operating on a processor of a network-connected computing device and configured to receive data via a network from a plurality of client devices, the data comprising at least a plurality of geolocation information and a device identifier, and configured to retrieve patron information from a Patron profile data store based at least in part on the device identifier, and configured to direct the operation of a display manager; a display manager comprising at least a plurality of programming instructions stored in a memory and operating on a processor of a network-connected computing device and configured to present at least a portion of the patron information to a human user for review, the presentation being based at least in part on direction from the patron management server; and a Patron profile data store comprising at least a plurality of programming instructions stored in a memory and operating on a processor of a network-connected computing device and configured to store and provide patron information to other system components.

According to another preferred embodiment of the invention, a method for automatic patron identification, comprising the steps of: broadcasting, using a location beacon comprising at least a plurality of programming instructions stored in a memory and operating on a processor of a network-connected computing device and configured to utilize a plurality of connected hardware devices to determine geolocation information for the computing device, and configured to provide at least a portion of this geolocation information via a network, and configured to provide a device identifier via a network, the device identifier being unique to the location beacon, a plurality of geolocation information and a device identifier; receiving, at a patron management server comprising at least a plurality of programming instructions stored in a memory and operating on a processor of a network-connected computing device and configured to receive data via a network from a plurality of client devices, the data comprising at least a plurality of geolocation information and a device identifier, and configured to retrieve patron information from a Patron profile data store based at least in part on the received data, and configured to direct the operation of a display manager, the geolocation information and device identifier; retrieving, using a Patron profile data store comprising at least a plurality of programming instructions stored in a memory and operating on a processor of a network-connected computing device and configured to store and provide patron information to other system components, a plurality of patron information based at least in part on the device identifier; providing at least a portion of the patron information to the patron management server; directing the operation of a display manager based at least in part on the patron information; and presenting, via a display manager comprising at least a plurality of programming instructions stored in a memory and operating on a processor of a network-connected computing device and configured to display information on a connected hardware display device based at least in part on direction from the patron management server, at least a portion of the patron information to a human user for review, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
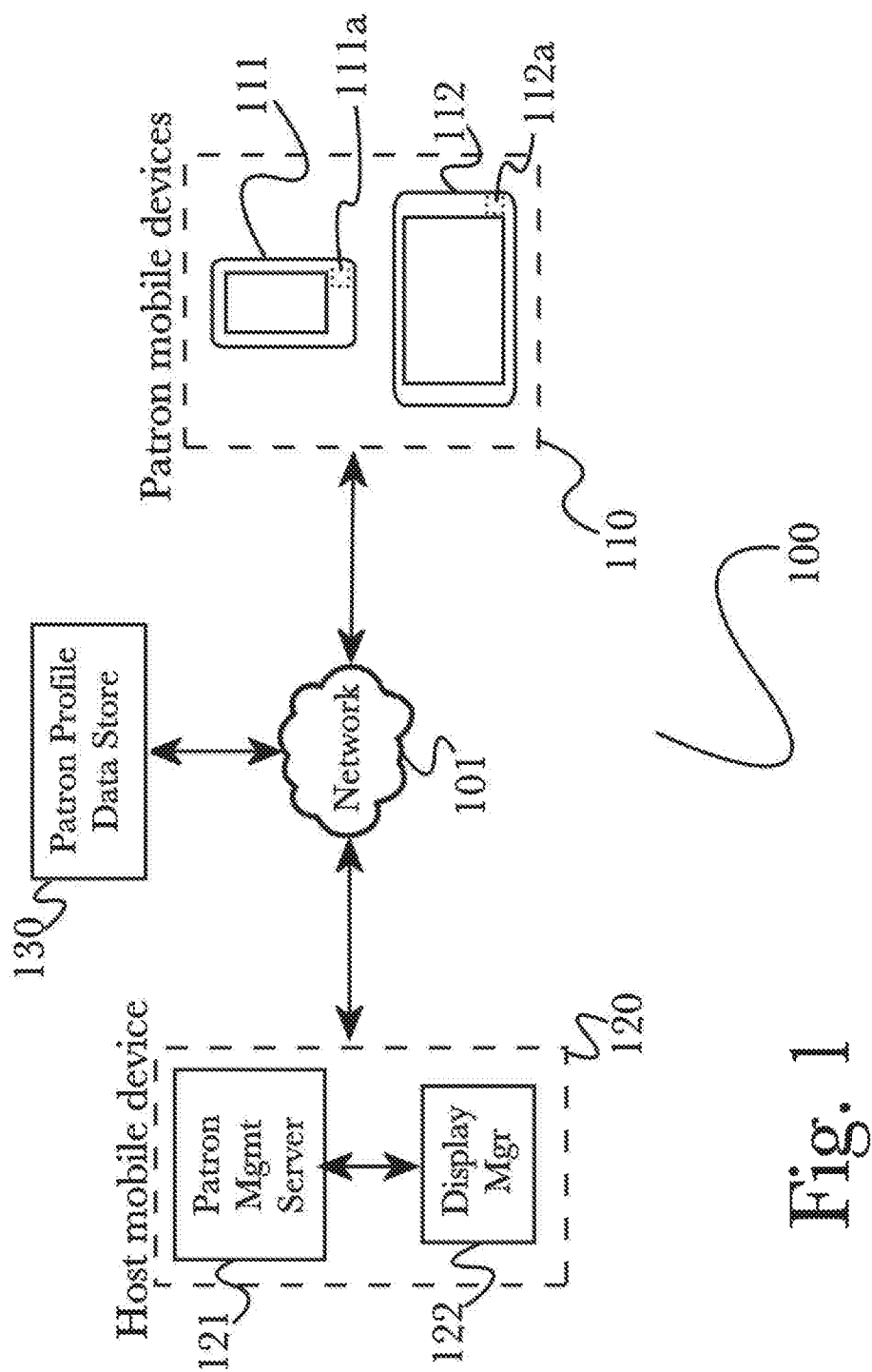
FIG. 1 is a block diagram of an exemplary system architecture for automated patron identification and communication management, according to a preferred embodiment of the invention.

The inventor has conceived, and reduced to practice, in a preferred embodiment of the invention, a system and method for automated patron identification and communication management.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "host" refers to any member or members of an establishment's wait staff or other customer service-oriented personnel whose job duties may include: taking a restaurant patron's food order at or near the time the patron is seated; bringing the prepared food that has been ordered to the correct restaurant patron for eventual consumption by that patron; polling the restaurant patron for satisfaction opinions and confirm that the patron and their party have vacated the table at the end of their stay, and may be used to refer to waiters or waitresses, food preparation staff, managers or administrative staff, or any other employees or members that may interact with a patron or patrons.

Conceptual Architecture

FIG. 1 is a block diagram of an exemplary system architecture 500 for automated patron identification and communication management, according to a preferred embodiment of the invention. According to the embodiment, a plurality of patron devices 110 such as (for example, including but not limited to) a smartphone 111 or tablet computing device 112 may connect to a network 101 such as a WiFi local area network, cellular wide-area network, short-range wireless interconnection protocol, or other data communication network according to the capabilities or intended use of a particular device. A patron device may comprise a location beacon 111a, 112a, that may utilize available network connections or global positioning to determine a device's geolocation through various software means (for example, using GPS satellites or cellular network triangulation, indoor positioning systems such as Wi-Fi positioning, as are commonly utilized in such devices) as well as to detect other location beacons operating on nearby devices. For example, a patron device 111 may detect a beacon operating on a host device 120 when they are in close proximity (such as within twenty feet, or other proximity thresholds according to a device's particular configuration or capabilities), and may use this beacon information to drive operation. Detected beacon information may then be provided via network 101 along with a device identifier token, for example a device's hardware media access control (MAC) address, which is generally unique to a particular device's network interface and may therefore be used to uniquely identify a particular device, or a user ID such as a patron's user name within a software application or service, or their contact information stored on the device, or other form of information that may be used to uniquely identify a patron via their device. To identify a host device when detected, a variety of identification tokens may be used such as a host's universal user ID (UUID) that may identify "this is a host device using the beacon service of your provider" to the patron device (and may be shared by all hosts within a restaurant or within an application to facilitate smooth operation and to ensure patron devices only wake and capture information when appropriate), or a unique host-specific ID that may be used to identify the particular host when detected (for example, some beacon technologies utilize a shared UUID that describes, for example, "this is a host using the app" so the patron device's application knows to capture this beacon information, as well as unique "major" or "minor" ID strings that uniquely identify a specific device within a group using a single UUID). Other forms of device identifier may include (for example) an IP address identifying the device within the scope of a particular network, a device's "friendly name" as is commonly used in BLUETOOTH™ operations, a devices telephone number, or a unique username or similar text-based identifier, for example as may be chosen by a user within a software application and used within the context of interactions with that particular software service or product. In some embodiments, a combination of identifier tokens may be used.

Device identifiers and geolocation information may be received by a host mobile device (that is, a mobile device being operate by a host user) 120, which may communicate with a patron management server 121, which may be a remote server communicating via the Internet or other wide-area network, or may be a local server on a local-area network, or may be a decentralized server operating across multiple devices (for example, using host mobile devices to operate the software functions of server 121) in direct networked communication (for example, according to the specific nature or arrangement of a network 101, described above) to receive a device identifier and query a patron profile data store 130 for patron information based at least in part on the received identifier. For example, a patron's account information stored in a patron profile data store 130 may comprise their contact information, a photograph, survey results, and/or a list of known devices with their corresponding device identifiers (whether MAC addresses or otherwise). In this manner, a received device identifier may be anonymous and secure with regard to other networked devices or potential information leaks, but within the scope of the appropriate patron profile data store 130 it may be used to uniquely identify a patron and retrieve any stored information. Patron management server 121 may then direct the operation of a display manager 122, that may for example comprise a video adapter operating on a mobile device (such as a smartphone, tablet computing device, or other computing device comprising at least a processor 41 and memory 43 as described below in FIG. 6 and capable of receiving software instructions and operating a display manager) to present patron information to a user for viewing or interaction, for example to present a patron's username (or other identifying information), contact information, a profile image such as a photograph of the patron to visually identify them (for example, to pick out a particular patron in a crowded room), or other information.

An exemplary use case of this system may be a patron utilizing a software application on a smartphone for a restaurant chain they like. The patron may configure an account within the application for example including a username and their device's MAC address and network capabilities (including geolocation capabilities). For example, a patron may install a provider's application on their device and authenticate their user information during an initial setup for the application, and from that point forward the application may have permission to operate in the background of their device, passively capturing beacon information for hosts using the provider's application as appropriate. When the patron approaches a restaurant with the application running (either in the foreground of their device or in the background, such as a closed but configured application installed on their device), their device may detect a nearby location beacon from a host device when they are near a participating restaurant (for example, if there is a restaurant host standing near the entrance to seat incoming customers, their device's beacon information may be detected). Detected beacon information may then be provided to a patron management server 121, which in turn uses the beacon information to retrieve the patron's information to provide it to hosts for use in seating and serving the patron. A host working at the restaurant may be operating a mobile POS on their own smartphone or tablet, which may then receive the patron's information (optionally, only when the patron is within a specified range or for a specified duration, to prevent "false positives" such as when a patron walks or drives past a restaurant). To address various situations where there may be multiple patrons or multiple hosts (or both), patron information may be presented in an ordered list such that most-recent or most-proximal patrons are presented in an ascending or descending order, allowing a host to quickly identify which patrons are nearest them (generally, the patrons at the table they are currently serving) to avoid confusion. For example, a patron may be nearby two or more hosts so it may not initially be clear which host is serving them. By presenting the patron's information to both hosts, they may manually identify the patron (such as by a photograph shown with their information) and continue operation. This also avoids confusion when a patron may walk past multiple hosts, or when multiple patrons enter simultaneously.

The host may then view the patron's information on their device, and may immediately have details such as dietary requirements or allergies, patron name or title, or any specific preferences such as a "usual drink order", favorite host, or other such information that may be configured and stored in a patron profile data store according to the embodiment. This enables the host to begin serving the patron with a level of familiarity otherwise not possible, making the overall dining experience more efficient for both parties and allowing the patron to enjoy the sense of being a "regular", such as being addressed by name and having their preferences already known. In some embodiments, a host's schedule may be cross-referenced with a patrons broadcast information (e.g. favorite host) and may be assigned to the patron. In some embodiments, host information may be presented to a patron via their mobile device, such as to view the host's name, contact or demographic information, particular job skills or specialties, or other information. This may be utilized (according to a particular patron or venue configuration, for example a user may be permitted to enable or disable functionality for their device or a venue may enable or disable functionality for all patrons) to provide a patron with information on their host to enhance their experience such as by enabling more familiarity during conversation, or allowing a patron to identify a host that will be particularly suited to their preference (such as a host that is familiar with their particular dietary preferences, or is skilled in taking custom orders), as well as to enable the configuration of custom preferences on a per-host basis, such as to specify a "favorite host" or to select hosts that a patron may wish to avoid. Optionally, satisfaction survey information (if available) may be utilized and attributed to a particular host (generally, the host with which a patron most recently interacted) and used to automatically determine such patron-and host-specific configuration (however, a patron or venue may override these automatic values as needed). Additionally, patrons may be presented with a survey or brief feedback interface during or after their transaction, such as a simple "thumbs-up" or "thumbs-down", or a detailed feedback or review according to a particular configuration. Survey or feedback data may also be compared to a transaction's details, such as items purchased or ordered, tips left, hosts interacted with, or other information that may be associated with a review to enhance feedback information with contextual data on the transaction being reviewed. Feedback may also comprise a "referral" functionality, wherein patrons may be encouraged or incentivized to refer others to a venue or to recommend their particular purchase or host. Patrons may also be presented with a greeting or advertisement from hosts or venues they like, for example when they come within a specified range, as described below.

In another exemplary use case, multiple patrons may arrive at a restaurant and a host may be presented with their individual information in an ordered fashion, for example sorted by distance from the host or arranged to reflect their seating at a table (for example, in a radial arrangement about an on-screen table, and rearranging in real-time as the host moves so that the display constantly mirrors the patrons' physical locations relative to the host). In this manner, a host may easily keep track of patrons within a party and seating arrangements, reducing the possibility of ordering errors even during periods of high activity.

A further exemplary arrangement may utilize proximity information to enable a "pre-order" feature, wherein patrons may be allowed to place orders or purchase products or service in advance while their location information is used to periodically update their ETA to a venue. This may be further used to enable patrons to (for example) order food at a restaurant before arriving, so that when they arrive their food is already prepared and they may dine immediately, or to enable a venue's food preparation staff to view a patron's ETA to determine when to begin preparing certain items. Pre-orders may also comprise reservations (according to a venue's particular configuration), and reservations may optionally present a patron with an option to select an "occasion" such as "business meal" or "birthday", to further customize their experience.

A further exemplary use case may be a "walk-by" interaction, wherein a patron may be notified if they pass within a configured range of a venue, for example so that they may be presented with an advertisement or greeting from a venue they frequent or from a particular host they like (as may be determined from previously-received review information, as described previously).

According to some arrangements, a display manager 122 may also be configured to receive user interaction, and to optionally direct the presentation of information based on this interaction, or provide at least a portion of the interaction to a patron management server 121 for use. For example, in some arrangements a host may be able to rearrange patrons on a display using a "click-and-drag" or "tap-and-drag" type interaction with visual indicia on their device, such as a patron's profile image (if available) or an icon or similar visual placeholder for a patron, such as to correct any errors in positioning about a table or to manually group patrons into parties such as when two groups are seated at a single table (such as at a bar where seating may be shared, or in a restaurant where a table may be splitting the bill) or one group is seated at multiple tables (as with very large parties). In another example, a host may be able to modify some or all of a patron's profile stored in a patron profile data store 130, for example to update a patron's contact information or allergen information. In such an arrangement, the host's interaction information may be used by patron management server 121 to direct a patron profile data store 130 to update the relevant information based on the interaction, and may optionally display a notification to the host or patron (or both) to notify them of the update. For example, a patron may notify their host that they have new dietary requirements, the host may then input these new preferences into their device, and then the patron may be notified on their device of the change and prompted to review and confirm the change. Additionally, a host may be notified if a patron updates their information manually via their device, such as if a patron updates their preferences while they are dining. For example, a patron who is currently eating may update their preferences to reflect a new "dislike" based on their current dish, which may be displayed to the host. This may prompt the host to check in with the patron and assist them with the unsatisfactory item proactively, instead of requiring the patron to wait for the host to return for another reason and then voice their issue. In this manner, errors may be reduced by enabling a patron to directly view and confirm or deny their patron information as it is modified, and any changes made to information may be made immediately known to both patron and host to facilitate proactive interaction and minimize the risk of errors.

Figure 2:
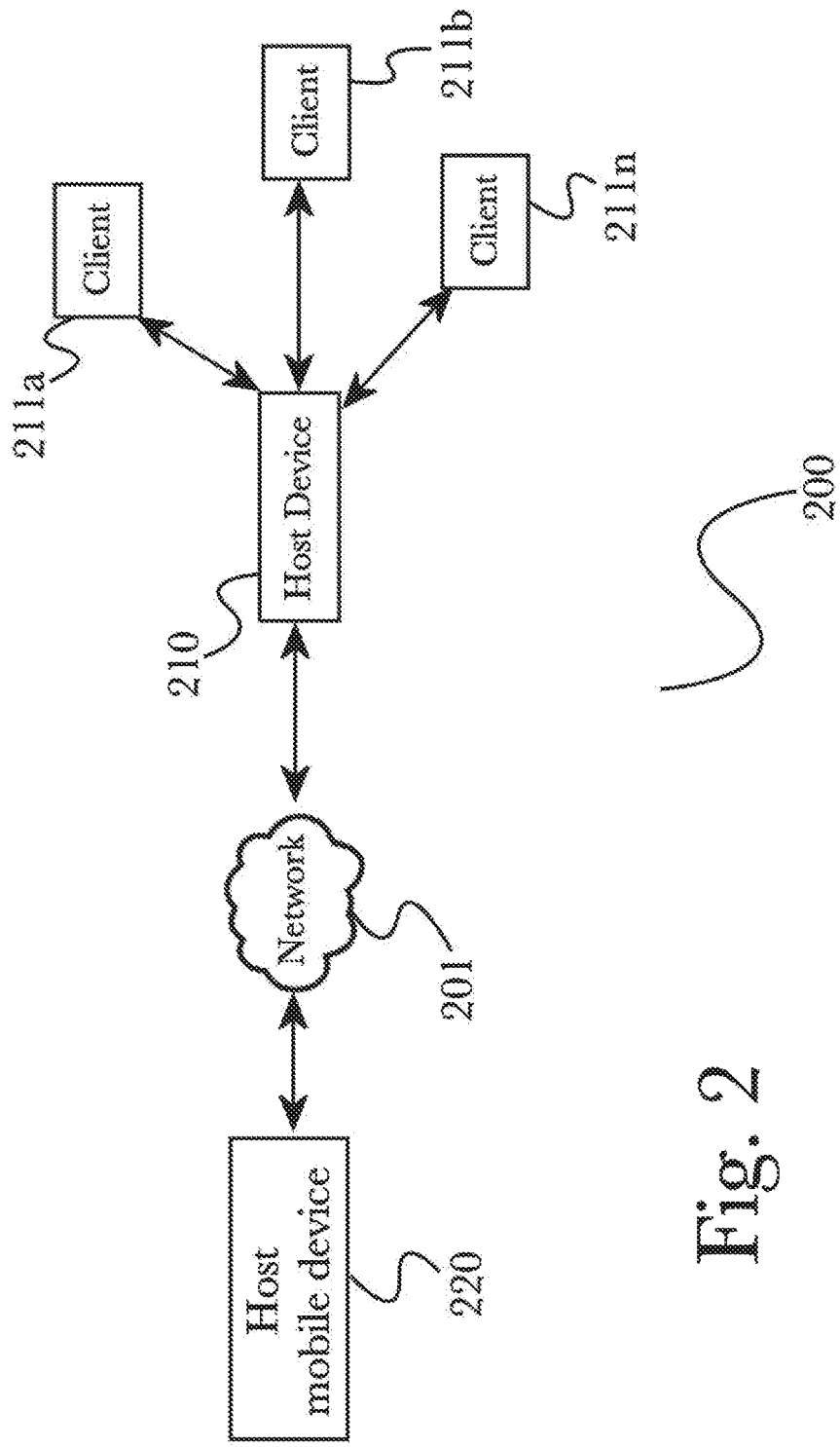
FIG. 2 is a block diagram of an exemplary alternate arrangement of a system for automated patron identification, illustrating the use of a patron device as a host for other clients.

FIG. 2 is a block diagram of an exemplary alternate arrangement of a system 200 for automated patron identification, illustrating the use of a patron device as a host for other clients.

According to the embodiment, a host device 210 may be a patron's mobile device, such as a smartphone, tablet computing device, or a specially programmed user device. Host device 210 may receive identification and geolocation information from a plurality of client devices 212a-n, and may optionally use this information to lookup any known patron information such as a user's contacts or other patrons using the same application or service, or with shared preferences. The user may then be able to group multiple patrons together into a "party", and their individual preferences may be combined and used to form a group preference for the party for ease of dining. For example, a user traveling abroad may be shown other individuals that speak their language, have similar dietary preferences (for example, enjoy the same type of wine based on region or grape), or come from their nation of origin. In another example, a user may be shown nearby people from their device's contact list, so they may easily dine with friends. Upon forming a group, a user may then search for restaurants that will satisfy the group preferences, thereby easily selecting places to dine that will be appropriate for all members of the party.

In some arrangements, a user's device may function interchangeably as host 210 and client 211a as needed, for example if they dine alone they may be considered only a client of a mobile POS 220 and operation may continue as described above in FIG. 1. This also enables patrons to function as clients of a host's device operating as a server device, as well as to function as servers to a host's device acting as a client to enable the patron to (for example) view location information for a host's device to locate their host for ordering or other assistance. Additionally, groups may be formed automatically without input from a user, such as when clients are discovered in a user's contact list or when specific preference criteria are met (optionally configurable by the users involved). For example, a user may configure their device to automatically group them with any other speakers of their native language, or with similar allergen profiles, making it easy to prioritize certain preferences when forming a group.

Automatic group creation may be used to automatically group users by proximity such as to group "everyone at this table" into a party, for ease of ordering and to economize data presentation on a mobile POS 220 via network 201. Patrons may also be able to selectively hide some or all of their preferences from others, or to make themselves entirely hidden, so that they are not shown to others or used in group formation (for example, when a user explicitly chooses to dine alone). Optionally, these hidden preferences may still be shown to a host, thereby enabling a user to (for example) select some preferences (such as specific dietary requirements) to conceal from other users, but to make available to their host (optionally along with a notification that such information is to be considered private, so the host does not openly disclose it around other users), so that the user may easily form groups with others despite potentially restrictive preferences, but the host may still be made aware of them to prevent any mishaps from occurring. Additionally, groups may be used for a "bill split" functionality, wherein some or all patrons in a group may have their specific purchases totaled and paid for separately from other group members. Group creation may also be used within a system 100 for the purpose of patron segmentation, such as to group patrons within a certain spending range or with particular attributes (such as food preferences or location details), and these patron segments may be further utilized in selecting or routing hosts for interaction. Patrons may also be grouped or identified according to known social media or other information, for example by identifying a patron's social network account details from their user information or profile and retrieving information pertaining to that social media account for use in identifying the patron or more precisely identifying their preferences or details. This social media information may be used to determine a particular patron's "clout" for segmentation purposes, or to identify recent activity relevant to a venue such as positive or negative feedback regarding a recent interaction (such as if a user posts about a recent meal at a restaurant on TWITTER™). These various segmentation and identification features may be used to allow venue staff to select their own schedules or other preferences to accommodate patrons with whom they have more positive interactions, allowing hosts and other staff to schedule their availability around "their customers" to increase patron and host satisfaction and further enhance a personalized patron experience, while also increasing revenue (as patrons will be more likely to purchase or tip for hosts they like or staff with whom they feel a personal relationship).

Detailed Description of Exemplary Embodiments

Figure 3:
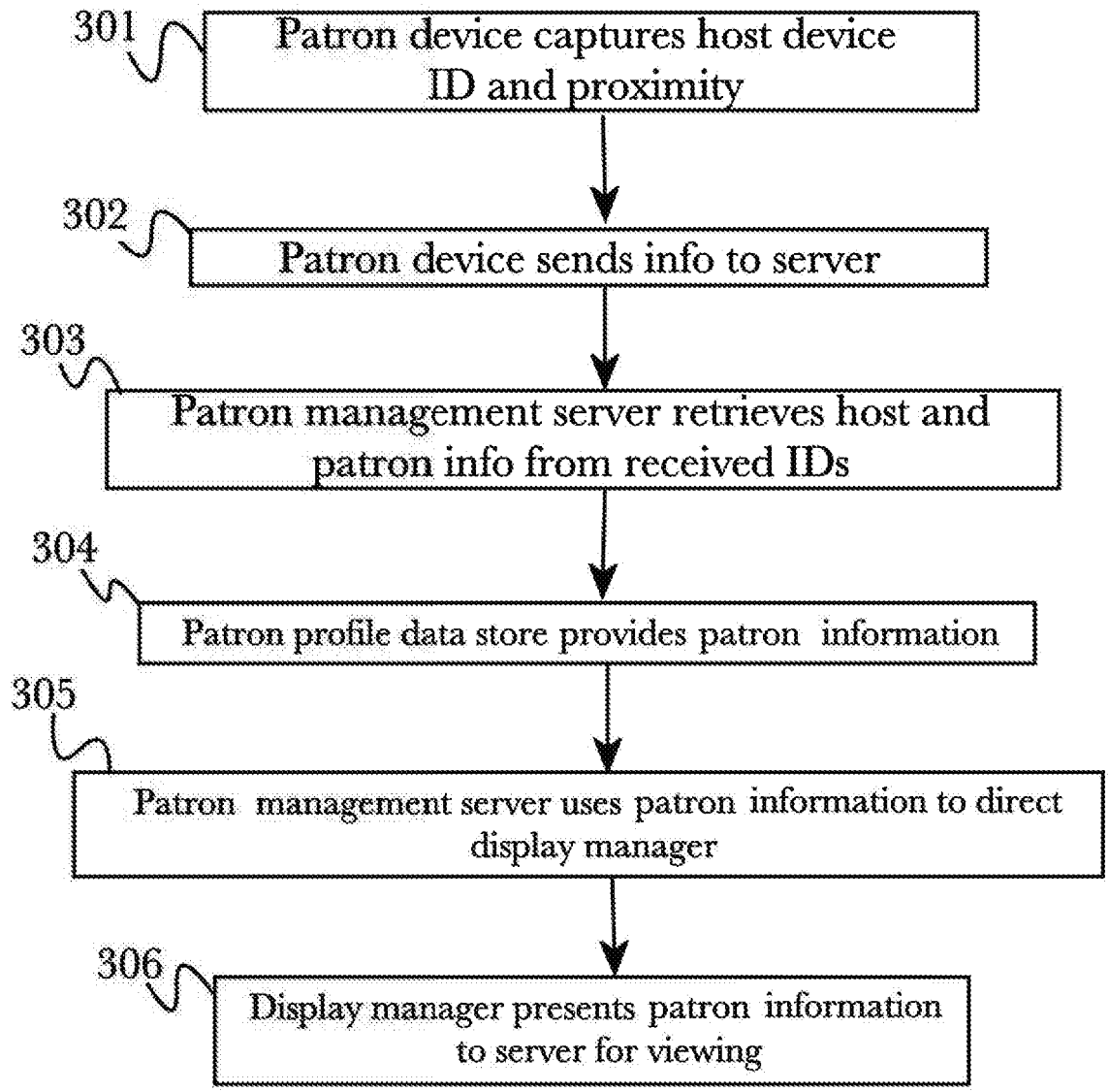
FIG. 3 is a flow diagram illustrating an exemplary method for automated patron identification, according to a preferred embodiment of the invention.

FIG. 3 is a flow diagram illustrating an exemplary method 300 for automated patron identification, according to a preferred embodiment of the invention. In an initial step 301, a patron device 110 (that may be any appropriate electronic device, generally capable of some level of geolocation and network communication, for example a smartphone 111 or a tablet computing device 112) may detect location information from a nearby location beacon operating on a host device and a device identifier for the device such as a hardware address or a software user identifier. In a next step 302, this information may be sent to a patron management server 121, along with the patron device's identifying information such as a hardware address or a software user identifier. In a next step 303, patron management server 121 may retrieve patron information from a patron profile data store 130 based on the received identification information, as well as host information based on the received location and identification information. For example, a patron device 110 may provide a MAC address that is associated with a user's account in a patron profile data store 130, which may therefore be retrieved by looking up the MAC address, and may capture a host device's ID with its location beacon information and provide this to identify the particular host (as opposed to simply identifying that it is a host device, as may be determined from a UUID that all hosts may share within a restaurant). In a next step

304, a Patron profile data store 130 performs the lookup, and if patron information is found it is retrieved and provided to the requesting patron management server. In a next step 305, the patron management server uses at least a portion of the provided patron information to direct a display manager 122, which in a final step 306 may display at least a portion of the patron information for viewing (such as by a host viewing patron information as they take orders, for example) or interaction (for example, for providing feedback or correcting displayed data as needed). In this manner, patron accounts and detailed personal information may be retrieved automatically based on the device they are using, automating and expediting the patron interaction process.

Figure 4:
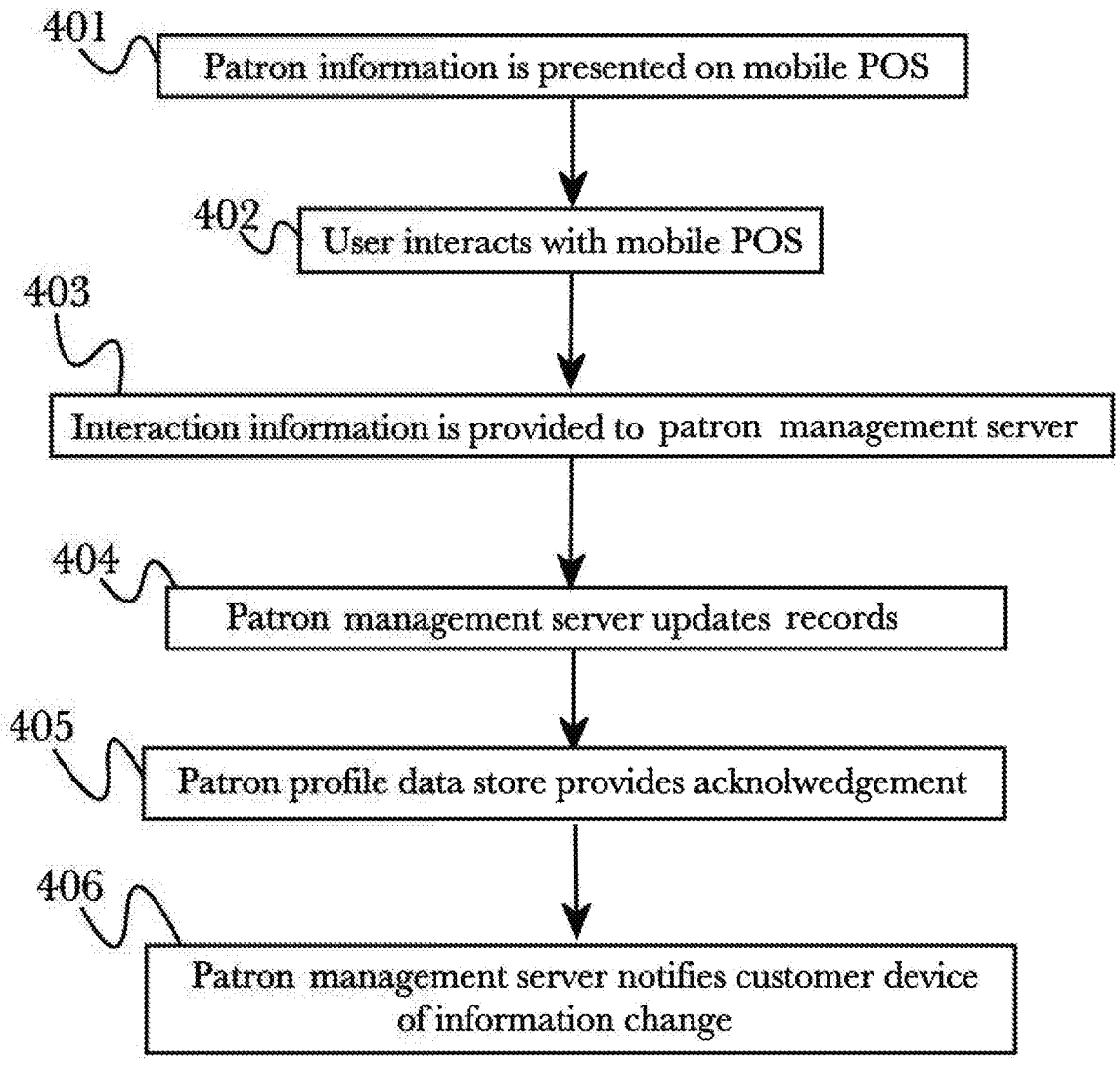
FIG. 4 is a flow diagram illustrating an exemplary method for proximity-based patron relationship management, according to a preferred embodiment of the invention.

FIG. 4 is a flow diagram illustrating an exemplary method 400 for proximity-based customer relationship management, according to a preferred embodiment of the invention. In an initial step 401, a mobile POS device may present patron information for review, and in a next step 402 may receive interaction from a user. In a next step 403, interaction information may then be provided to a patron management server for processing, generally to determine whether a change to patron data is required (for example, changing a patron's location to rearrange them does not indicate that stored information needs to be changed, but adding a dietary preference does). In a next step 404, the patron management server may then direct a patron profile data store to update stored records as needed, and the patron profile data store may acknowledge the change in a next step 405. Patron management server may then, in a final step 406, notify a patron of the information change (for example, to give them an opportunity to review and verify the details of a change, or to notify them in case a change was unauthorized). Additionally, the roles of "client" and "host" may be reversed, as when a patron updates their own information, so that a host may be notified of any changes (their mobile POS device acting in the role of "client" in such a case).

Figure 5:
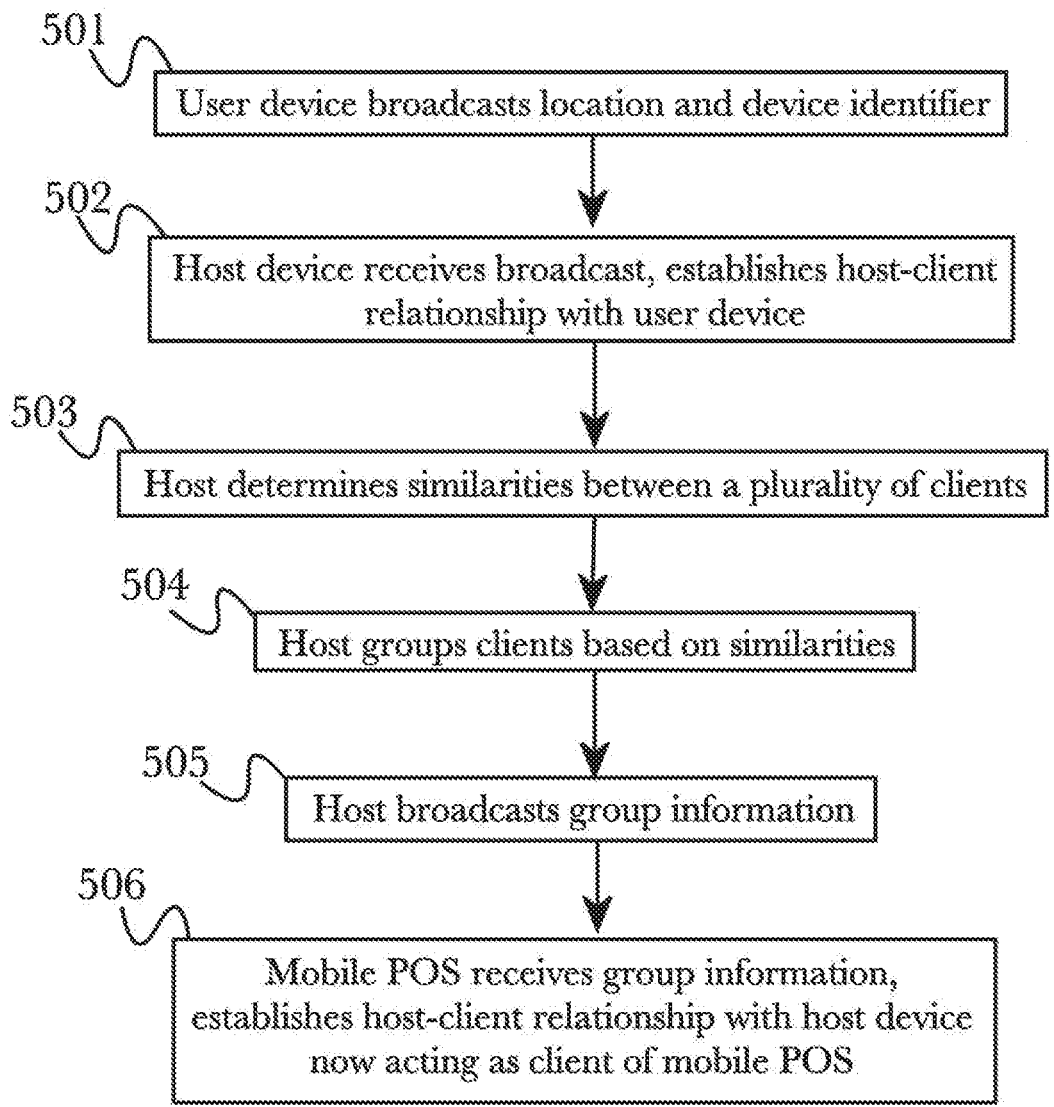
FIG. 5 is a flow diagram illustrating an exemplary method for proximity-based discovery and group creation, according to a preferred embodiment of the invention.

FIG. 5 is a flow diagram illustrating an exemplary method 500 for proximity-based discovery and group creation, according to a preferred embodiment of the invention. In an initial step 501, a user's device may broadcast location and identification information via a network, to provide this information to other devices that may be configured to listen for it. In a next step 502, a "host" device (that may be a similar user device, for example a smartphone) may receive broadcast information and establish a host-client relationship with a user device operating as a client of the host device. In a next step 503, the host device may determine any similarities in available information for a plurality of client devices from which it has received broadcast information, and if similarities are found it may then, in a next step 504, group clients based at least in part on the similarities identified. In a next step 505, the host device may broadcast group information, which may then be received by a mobile POS device in a final step 506, which may form a host-client relationship wherein the host device now functions as a client of the mobile POS. In this manner, groups may be formed and used automatically and various devices may alternate between client and host operational modes as needed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
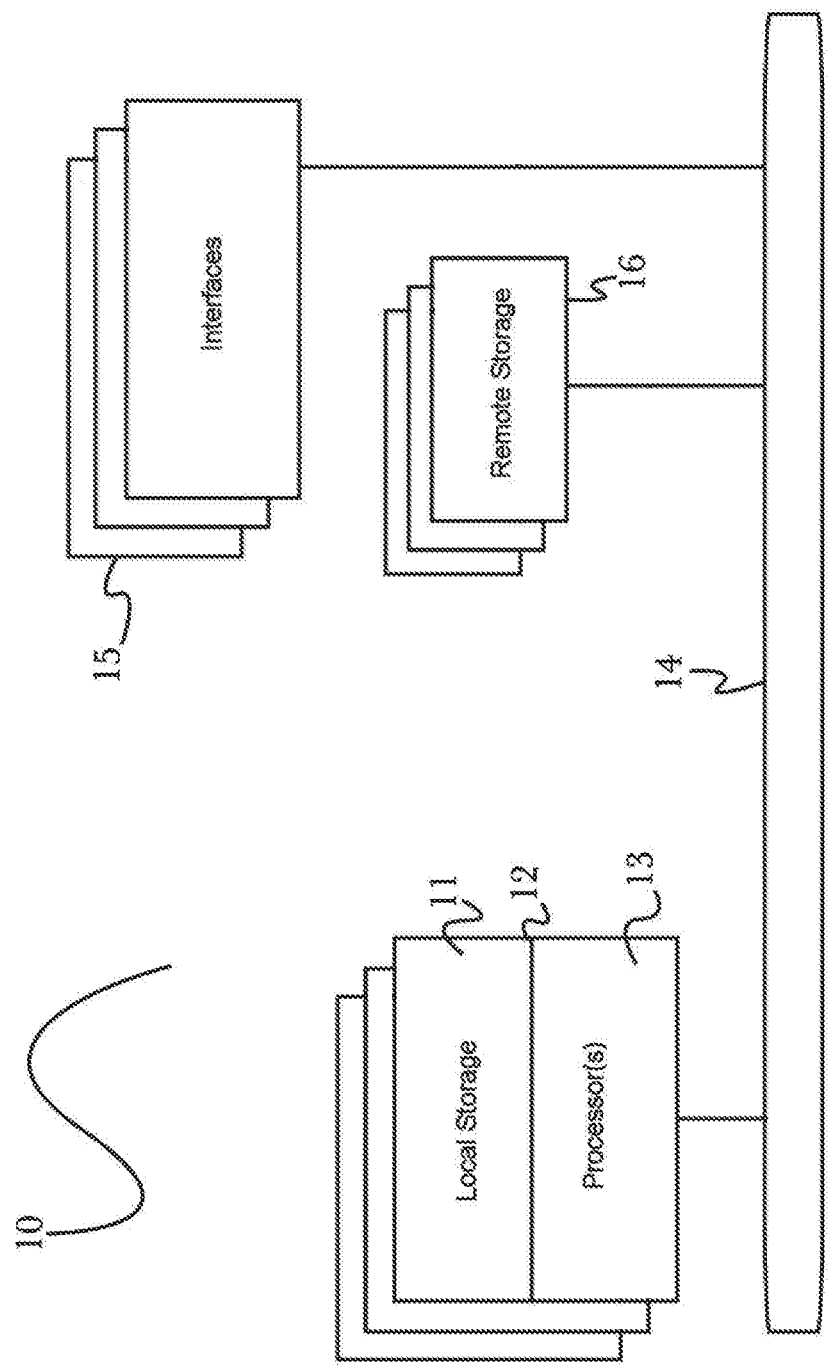
FIG. 6 is a block diagram illustrating an exemplary hardware architecture of a computing device used in an embodiment of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software-or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
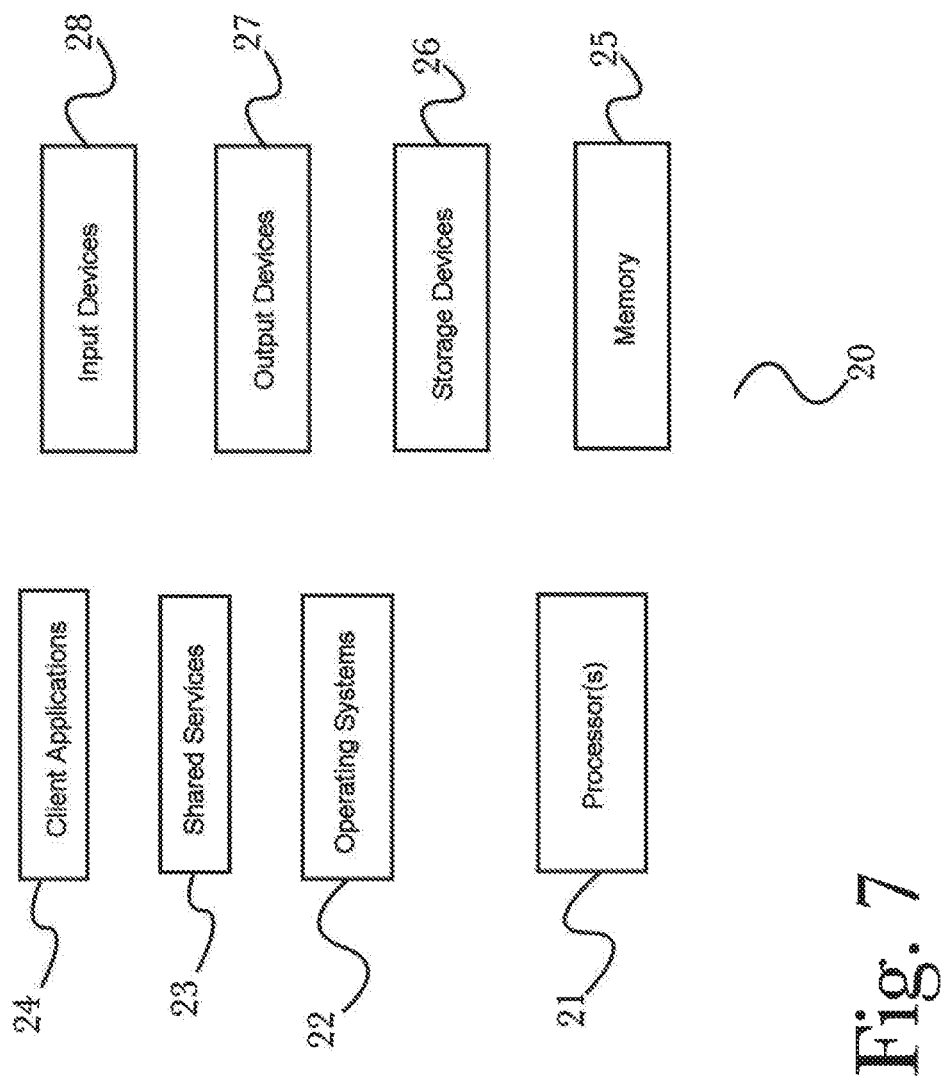
FIG. 7 is a block diagram illustrating an exemplary logical architecture for a client device, according to an embodiment of the invention.

In some embodiments, systems according to the present invention may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
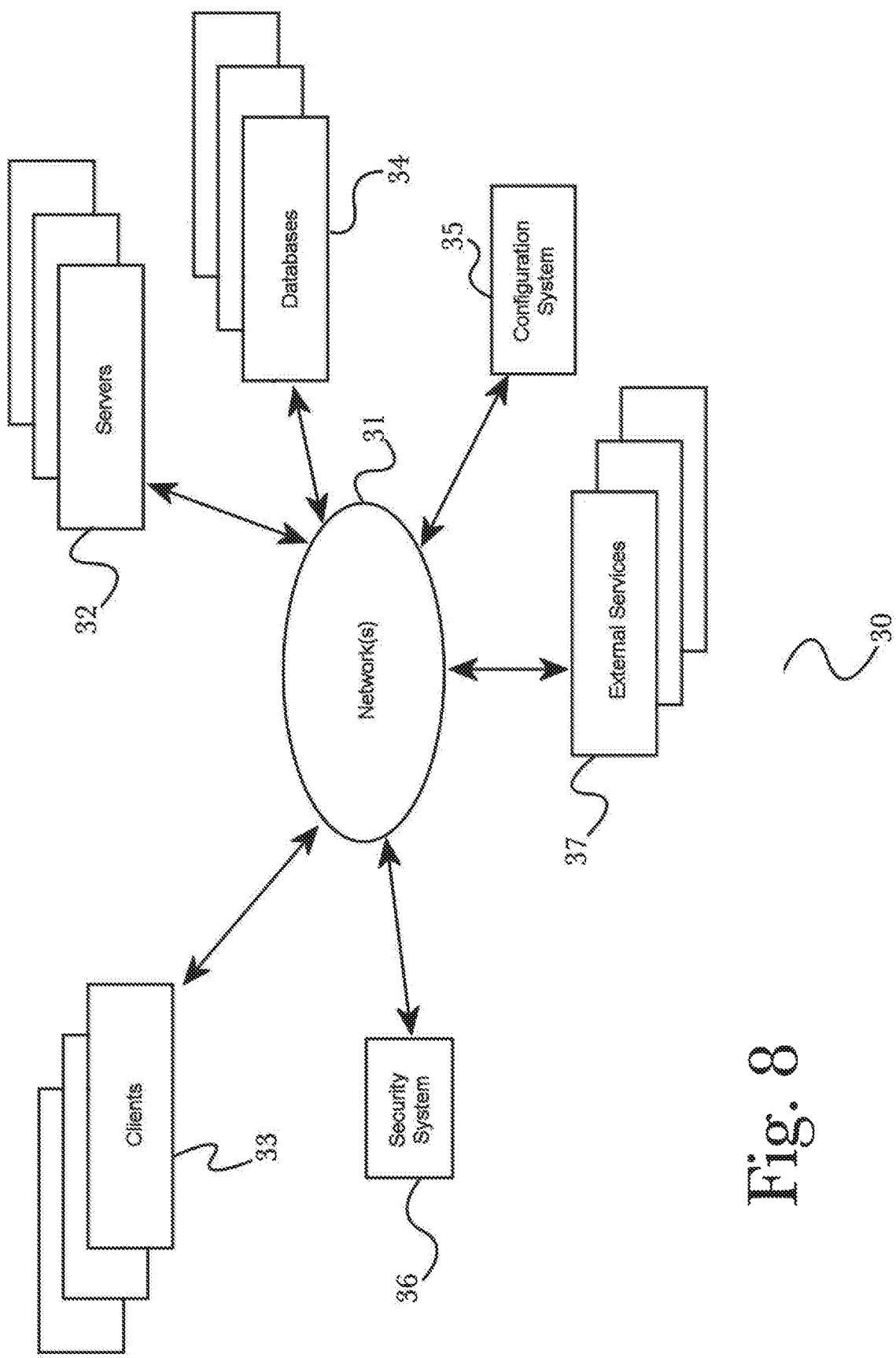
FIG. 8 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 8, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 9:
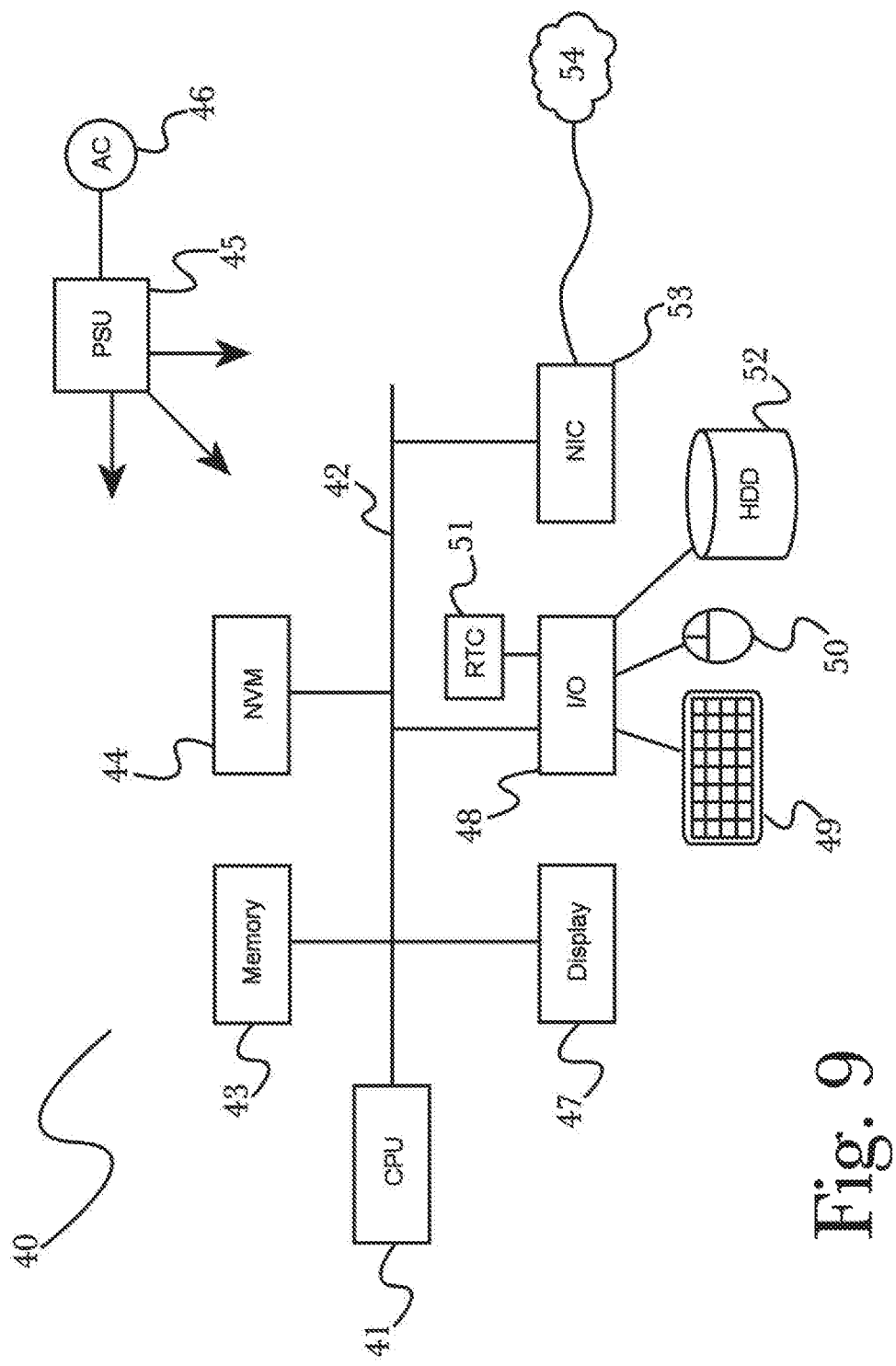
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated patron identification and communication management, comprising:
   a network-connected patron management server comprising a memory, at least one processor, and a plurality of programming instructions stored in a memory, the plurality of programming instructions when executed by the processor, cause the processor to:
   receive data via a network from a plurality of client devices, the data comprising at least geolocation information and a device identifier;
   identify a plurality of information similarities between the plurality of client devices, the information similarities determined using each device's respective location information and device identifier;
   automatically create a group comprising at least a portion of the plurality of client devices, the logical group being based at least in part on at least a portion of the information similarities;
   determine group information based at least in part on at least a portion of the information similarities;
   automatically broadcast at least a portion of the group information via a network; and
   direct the operation of a display manager;
   a network-connected display manager comprising another plurality of programming instructions stored in the memory, the another plurality of programming instructions when executed by the at least one processor, cause the processor to:
   present at least a portion of the group information to a human user for review, the presentation being based at least in part on direction from the patron management server.

2. The system of claim 1, wherein the device identifier comprises a hardware MAC address.

3. The system of claim 1, wherein the device identifier comprises a device network address.

4. The system of claim 1, wherein the device identifier comprises a text-based identifier.

5. The system of claim 4, wherein the text-based identifier comprises a username representing a particular user account within a particular software application.

6. The system of claim 1, wherein the patron management server is further configured to receive group information automatically via a network, and to direct the operation of the network-connected display device based at least in part on the received group information.

7. A method for automatic patron identification and communication management, comprising the steps of:
   receiving, at a patron management server comprising at least a plurality of programming instructions stored in a memory and operating on a processor of a network-connected computing device, geolocation information and device identifiers from a plurality of client devices via a network;
   identifying a plurality of information similarities between at least a portion of the client devices, the information similarities determined using each device's respective location information and device identifier;
   automatically forming a group based at least in part on the information similarities;
   producing group information based at least in part on the information similarities;
   presenting, via a display manager comprising at least a plurality of programming instructions stored in a memory and operating on a processor of a network-connected computing device, at least a portion of the group information patron profile to a human user for review.

* * * * *